(12) United States Patent
An et al.

(10) Patent No.: US 7,308,733 B2
(45) Date of Patent: Dec. 18, 2007

(54) SWIVEL HINGE ASSEMBLY AND ELECTRONIC DEVICE HAVING THE SAME

(75) Inventors: Byeong-Duk An, Osan (KR); Hyo-Sik Shin, Suwon (KR); Jun-Hyung Park, Anyang (KR); Bum-Gyu Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 282 days.

(21) Appl. No.: 10/797,084

(22) Filed: Mar. 11, 2004

(65) Prior Publication Data

US 2004/0227045 A1  Nov. 18, 2004

(30) Foreign Application Priority Data

May 15, 2003  (KR) .................. 10-2003-0031020
Nov. 7, 2003   (KR) .................. 10-2003-0078817
Nov. 14, 2003  (KR) .................. 10-2003-0080760

(51) Int. Cl.
  *E05D 3/10*   (2006.01)
  *E04G 3/00*   (2006.01)

(52) U.S. Cl. .............. 16/367; 361/681; 455/575.1; 248/278.1; 248/921

(58) Field of Classification Search ............. 16/312, 16/313, 315, 318, 343, 364, 350, 351, 366, 16/367, 250, 254, 302; 361/802, 803, 680–683; 379/433.13, 433, 428; 455/90, 556, 575; 403/118–120
See application file for complete search history.

(56) References Cited

U.S. PATENT DOCUMENTS

| | | | |
|---|---|---|---|
| 5,335,142 A | * | 8/1994 | Anderson ................ 361/681 |
| 6,105,919 A | * | 8/2000 | Min ........................ 248/418 |
| 6,275,376 B1 | | 8/2001 | Moon ...................... 361/683 |
| 6,553,625 B2 | * | 4/2003 | Lin et al. .................. 16/342 |
| 6,587,333 B2 | * | 7/2003 | Tseng et al. .............. 361/681 |
| 6,742,221 B2 | * | 6/2004 | Lu et al. ................... 16/367 |
| 6,766,182 B2 | * | 7/2004 | Janninck et al. ......... 455/575.3 |
| 6,850,407 B2 | * | 2/2005 | Tanimoto et al. .......... 361/681 |
| 6,876,545 B2 | * | 4/2005 | Tseng et al. .............. 361/681 |
| 6,883,206 B2 | * | 4/2005 | Yang et al. ................ 16/337 |
| 2003/0040288 A1 | * | 2/2003 | Kang et al. ................ 455/90 |
| 2004/0110529 A1 | * | 6/2004 | Watanabe et al. ........ 455/550.1 |
| 2004/0179330 A1 | * | 9/2004 | Lee et al. ................ 361/679 |
| 2004/0228081 A1 | * | 11/2004 | Lee ........................ 361/683 |

FOREIGN PATENT DOCUMENTS

| | | |
|---|---|---|
| CN | 2487001 | 4/2002 |
| KR | 1020030081761 | 10/2003 |

* cited by examiner

*Primary Examiner*—Robert J. Sandy
(74) *Attorney, Agent, or Firm*—Ked & Associates, LLP

(57) ABSTRACT

A swivel hinge assembly is provided for use in an electronic device, such as a portable electronic device. The swivel hinge assembly includes a first rotary shaft configured to be rotatable about a substantially vertically extending axis, a base configured to be rotatable in a substantially horizontal plane by the first rotary shaft, and a second rotary shaft, which is installed on the base, at least a portion of which is configured to be rotatable about a substantially horizontally extending axis which intersects with the first rotary shaft. The swivel hinge assembly may further comprise a cover plate configured to cover an opening formed on a top surface of a main body of the electronic device, and in which the base rotates.

21 Claims, 17 Drawing Sheets

SWIVEL HINGE ASSEMBLY AND ELECTRONIC DEVICE HAVING THE SAME

BACKGROUND OF THE INVENTION

1. Field of the Invention

The invention relates to an electronic device, and more particularly, to a swivel hinge assembly for an electronic device, such as a portable electronic device.

2. Background of the Related Art

FIGS. 1A to 1C show a related art portable electronic device having a swivel hinge. Referring to FIGS. 1A to 1C, a variety of parts, such as a main board and a hard disk drive, are installed within a main body 1. A keyboard 3 which functions as an input device is provided on a top surface of the main body 1. A display unit 5 is connected to an end of the main body 1. Generally, a liquid crystal display (LCD) is used as the display unit 5; however, other types of display units may also be appropriate.

The display unit 5 can be pivoted to be folded or unfolded with respect to the main body 1, as shown in FIGS. 1B and 1C, and can also be rotated horizontally as viewed from the front of the main body 1, as shown in FIG. 1C. This is possible because the main body 1 and the display unit 5 are connected to each other by a swivel hinge assembly 7.

The swivel hinge assembly 7 allows the display unit 5 to be rotated horizontally about a rotary plate 7r. An end of a connection plate 7c is connected to the rotary plate 7r. A center of rotation in a fore and aft direction is positioned along a tangential direction of a circular arc defined by and at the periphery of the rotary plate 7r. Thus, the central axis of rotation in the lateral direction and the central axis of rotation in the fore and aft direction are not orthogonal to each other on the same plane.

In such a related art, the display unit 5 is pivoted in a fore and aft direction on the top surface of the main body 1, that is, pivoted about the horizontally extending axis of rotation on the one end of the connection plate 7c, to be folded or unfolded with respect to the main body 1. At the same time, the display unit 5 is rotated horizontally about a vertically extending axis of rotation provided on the rotary plate 7r.

Therefore, the display unit 5 can be used in various rotated states. More particularly, the display unit 5 can be used in a state in which a rear surface thereof is in close contact with the top surface of the main body 1, as shown in FIG. 1C. Thus, the display unit 5 may be used as a tablet computer.

However, there are the following problems in the related art.

Since the rotary plate 7r of the swivel hinge assembly 7 is in the shape of a circle, the swivel assembly 7 occupies a large area on the top surface of the main body 1. Therefore, the keyboard 3 cannot be installed in at least a portion having a width corresponding to a diameter of the rotary plate 7r. In other words, right and left areas on the top surface of the main body 1 with respect to the rotary plate 7r are not available for placement of the keyboard 3.

Further, there is the inconvenience in the related art that the keyboard 3 is located near the front end of the main body 1 and thus there are no portions for supporting the wrists of a user when the user presses the keys of the keyboard 3. To solve the aforementioned problems, the swivel hinge assembly 7 must be formed to protrude from the rear end of the main body 1. However, if the swivel hinge assembly 7 protrudes from the rear end of the main body 1, an external appearance of the device is not suitable for design purposes.

Further, the display unit 5 is unstable since the display unit 5 may be positioned beyond the rear end of the main body 1.

SUMMARY OF THE INVENTION

An object of the invention is to substantially solve at least one or more of the above problems and/or disadvantages, in whole or in part, and to provide at least the advantages described hereinafter.

In order to achieve at least the above objects, in whole or in part, and in accordance with the purposes of the invention, as embodied and broadly described, there is provided a swivel hinge assembly in accordance with an embodiment of the invention comprising a first rotary shaft configured to be rotatable about a substantially vertically extending axis, a base configured to be rotatable in a substantially horizontal plane by the first rotary shaft, and a second rotary shaft, which is installed on the base, at least a portion of which is configured to be rotatable about a substantially horizontally extending axis which intersects with the first rotary shaft.

To further achieve at least the above objects, in whole or in part, and in accordance with the purposes of the invention, as embodied and broadly described, there is provided an electronic device in accordance with an embodiment of the invention comprising a main body having an opening therein, a rotatable display unit, and a swivel hinge assembly configured to rotatably connect the display unit to the main body, wherein the swivel hinge assembly comprises a first rotary shaft configured to be rotatable about a substantially vertically extending axis and which is supported on the main body, a base configured to be rotatable in a substantially horizontal plane by the first rotary shaft in the opening such that the base is level with a top surface of the main body, and a second rotary shaft, which is installed on the base, at least a portion of which is configured to be rotatable about a substantially horizontally extending axis, which intersects with the first rotary shaft, and which is connected to the display unit.

To further achieve at least the above objects, in whole or in part, and in accordance with the purposes of the invention, as embodied and broadly described, there is provided a swivel hinge assembly in accordance with an embodiment of the invention for use in an electronic device including a main body and a display unit, the swivel hinge assembly comprising a first frame, a second frame, including a base which is mounted on the first frame so as to be rotatable in a substantially horizontal plane about a first substantially vertical axis of rotation with respect to the first frame and a rotary shaft, which is installed on the base, at least a portion of which is configured to be rotatable about a substantially horizontally extending axis of rotation substantially orthogonal to the first axis of rotation.

To further achieve at least the above objects, in whole or in part, and in accordance with the purposes of the invention, as embodied and broadly described, there is provided an electronic device in accordance with an embodiment of the invention comprising a main body having an opening formed therein, a display unit configured to display information, one end of which is connected to the main body, and a swivel hinge assembly comprising a first frame affixed to the main body and a second frame configured to allow the display unit to be rotated in a substantially horizontal plane about a substantially vertically extending axis with respect to the main body, said second frame having a plurality of cutout portions, such that the second frame does not extend beyond a back wall of the main body when the display unit is positioned to face substantially forward or rearward with respect to the main body.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Hereinafter, a swivel hinge assembly and a portable electronic device having the same according to embodiments of the invention will be described in detail with reference to the accompanying drawings. A combined notebook and tablet computer are described herein as an example of a portable electronic device. However, the invention can also be applied to a variety of electronic devices, including portable electronic devices, such as notebook computers, mobile phones, and tablet computers, for which it is desirable that a display unit and main body thereof be folded to face each other and unfolded to move away from each other.

Figure 1A:
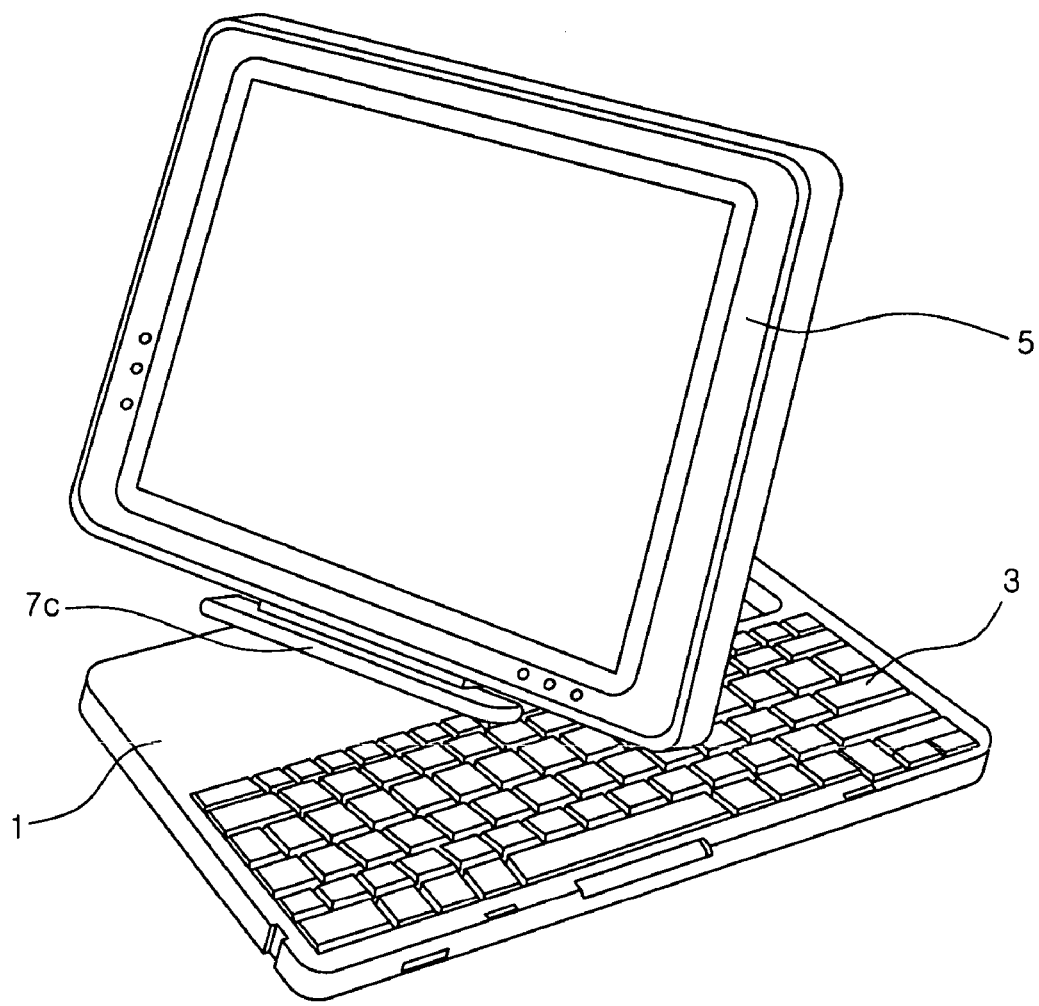
FIG. 1A is a perspective view of a related art portable electronic device having a related art swivel hinge assembly.
Figure 1B:
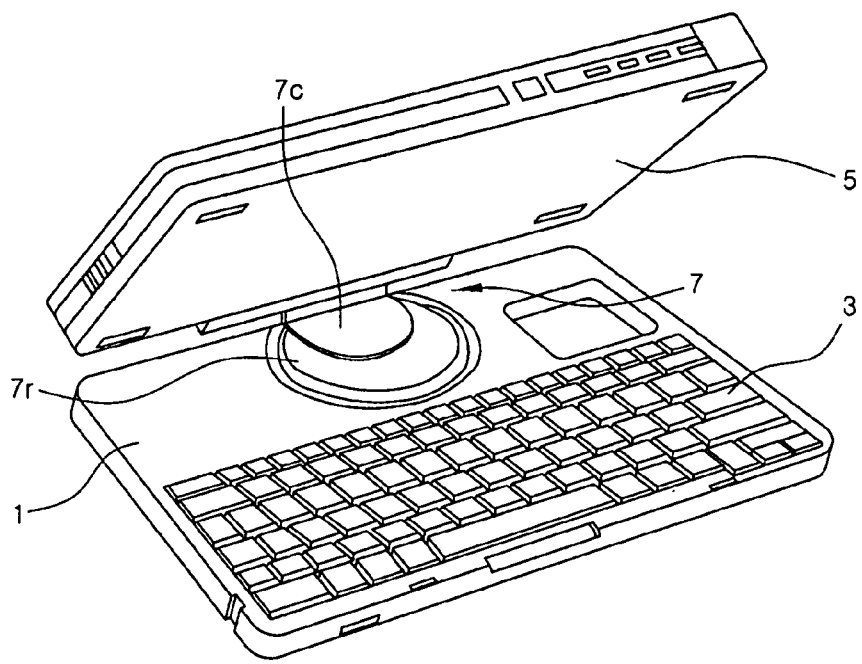
FIG. 1B is a perspective view of a related art portable electronic device having a related art swivel hinge assembly.
Figure 1C:
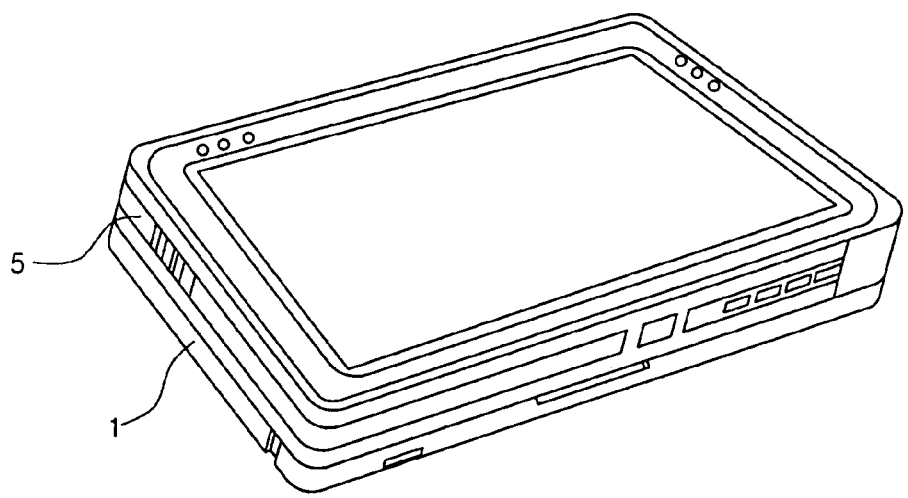
FIG. 1C is a perspective view showing a related art portable electronic device in a state in which a rear surface of a display unit is folded to face a main body according to the related art.
Figure 2A:
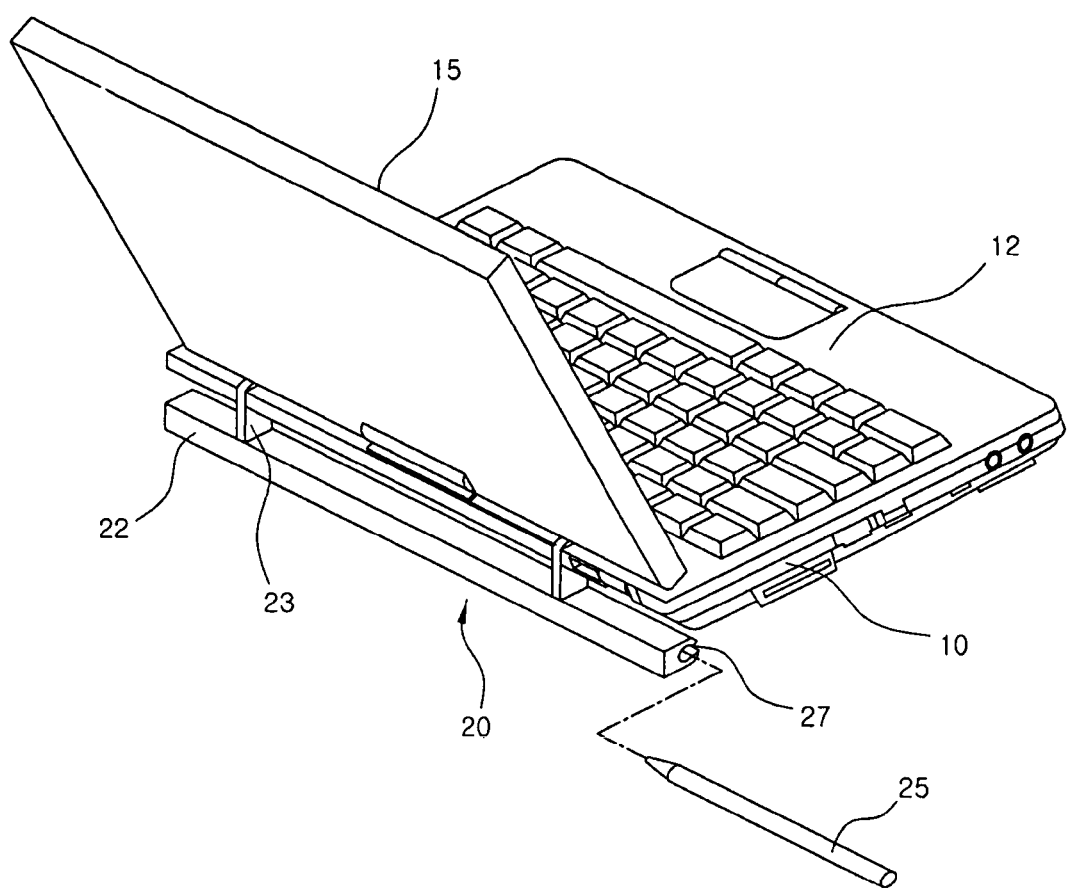
FIG. 2A is a schematic rear perspective view of a portable electronic device having a swivel hinge assembly according to an embodiment of the invention.
Figure 2B:
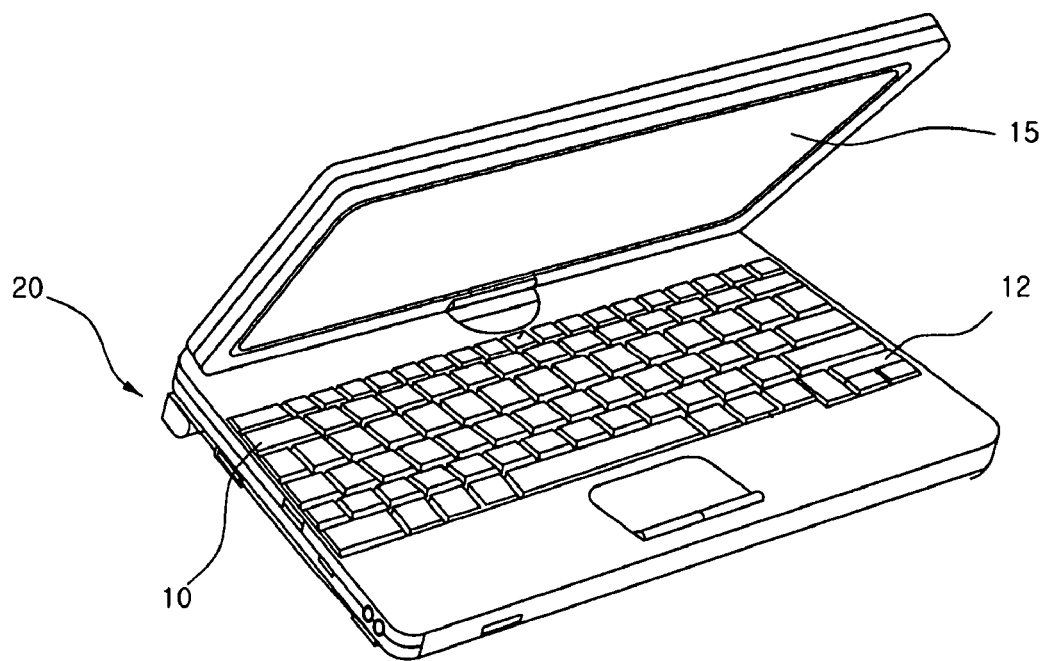
FIG. 2B is a schematic front perspective view of the portable electronic device of FIG. 2A.
Figure 3:
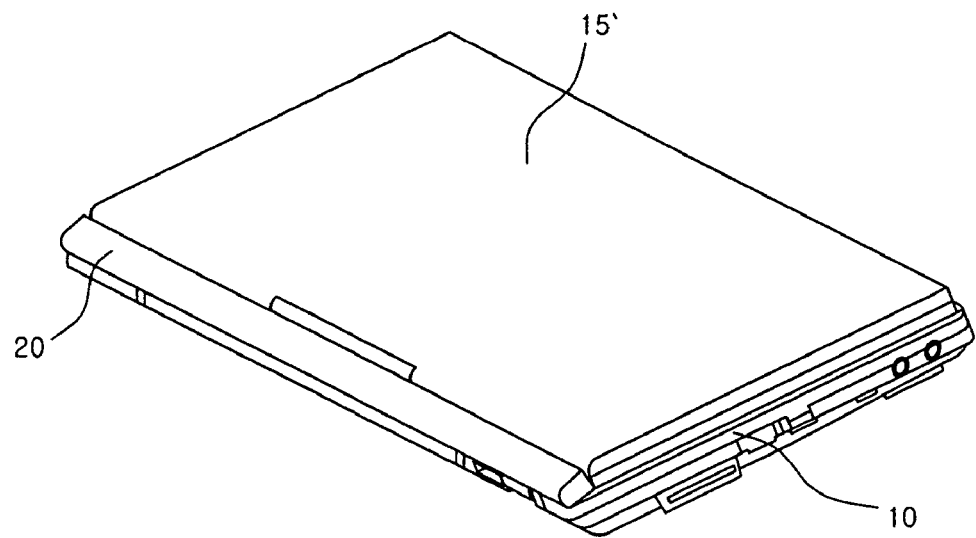
FIG. 3 is a schematic perspective view of the portable electronic device in a folded state.

FIG. 2A is a schematic rear perspective view of a portable electronic device with a swivel hinge assembly according to an embodiment of the invention. FIG. 2B is a schematic front perspective view of the portable electronic device of FIG. 2A. FIG. 3 is a schematic perspective view of the portable electronic device according to an embodiment of FIG. 2A in a folded state.

The portable electronic device of FIG. 2A includes a main body 10 and a display unit 15 that may be folded or unfolded with respect to each other, similarly to a so-called notebook computer. An input 12 may be provided on a top surface of the main body 10. The input 12 may be a keyboard comprising a plurality of keys for inputting characters, numerals, symbols, etc. Another input device, such as a touchpad or pointing stick, also may be provided on the top surface of the main body 10. Parts, including a main board, a hard disk drive, etc., may be installed within the main body 10.

The display unit 15 may be, for example, a touch screen or liquid crystal display (LCD). For example, in some embodiments of the invention, the display unit 15 may be configured in the form of a tablet computer, and may include a touch screen such that input may made through the display unit 15 itself In addition, the main body 10 and the display unit 15 can be variously combined with each other for various functions. For example, similar to a notebook computer, parts, including a main board, a hard disk drive, etc., may be contained in the main body 10 and the display unit 15 may have only a display function without an input function. Alternatively, the display unit 15 may be configured in the form of a tablet computer and the main body 10 may be provided with an additional input device and without a main board.

Further, a tilting stand 20 may be provided at a rear end of the main body 10 where the main body 10 and the display unit 15 are connected with each other. The tilting stand 20 allows the rear end of the main body 10 to be positioned relatively higher than a front end thereof which results in easier keying operations.

The tilting stand 20 may comprise a support bar 22, as shown in FIG. 2A. In this embodiment, the support bar 22 has a length corresponding to a lateral width of the main body 10 and is selectively supported on the floor or ground on which the main body 10 is positioned. One or more hinge connection bars 23 extends substantially vertically from the support bar 22 and is hingedly connected to the main body 10, as shown in FIG. 2A. In this embodiment, at least two hinge connection bars 23 are provided based on the length of the support bar 22. The support bar 22 is hingedly connected to the main body 10 such that the tilting stand 20 is rotatable only when a force greater than a specific value is applied thereto. This prevents the tilting stand 20 from being inadvertently rotated due to a small external force applied thereto during its use.

The tilting stand 20 provided on the rear end of the main body 10 is securely seated on a rear end of the top surface of the main body 10 when it is not in use, as shown in FIG. 3. When the tilting stand is in use, that is, when the main body 10 is used in an inclined position, the tilting stand 20 is supported on a surface on which the electronic device is positioned, as shown in FIG. 2A.

The tilting stand 20 may be formed with a pen reception portion 27 into which a stylus pen 25 may be inserted, as shown in FIG. 2A. The pen reception portion 27 may be formed in a longitudinal direction of the support bar 22 such that its entrance hole is provided on an end of the tilting stand 20, as shown in FIG. 2A. The stylus pen 25 inserted into the pen reception portion 27 is needed when the display unit 15 is configured in the form of a tablet computer.

A swivel hinge assembly according to various embodiments of the invention will be discussed hereinbelow. The swivel hinge assembly according to embodiments of the invention allows a display unit to be vertically and horizontally rotated with respect to a main body of an electronic device, such as a portable electronic device. Various features of the swivel hinge assembly according to the embodiments of the invention may be utilized on any of the various embodiments and are not limited to any particular embodiment. For example, the spring-loaded cover plate 60 may be utilized with any of the various embodiments of the invention.

Figure 4:
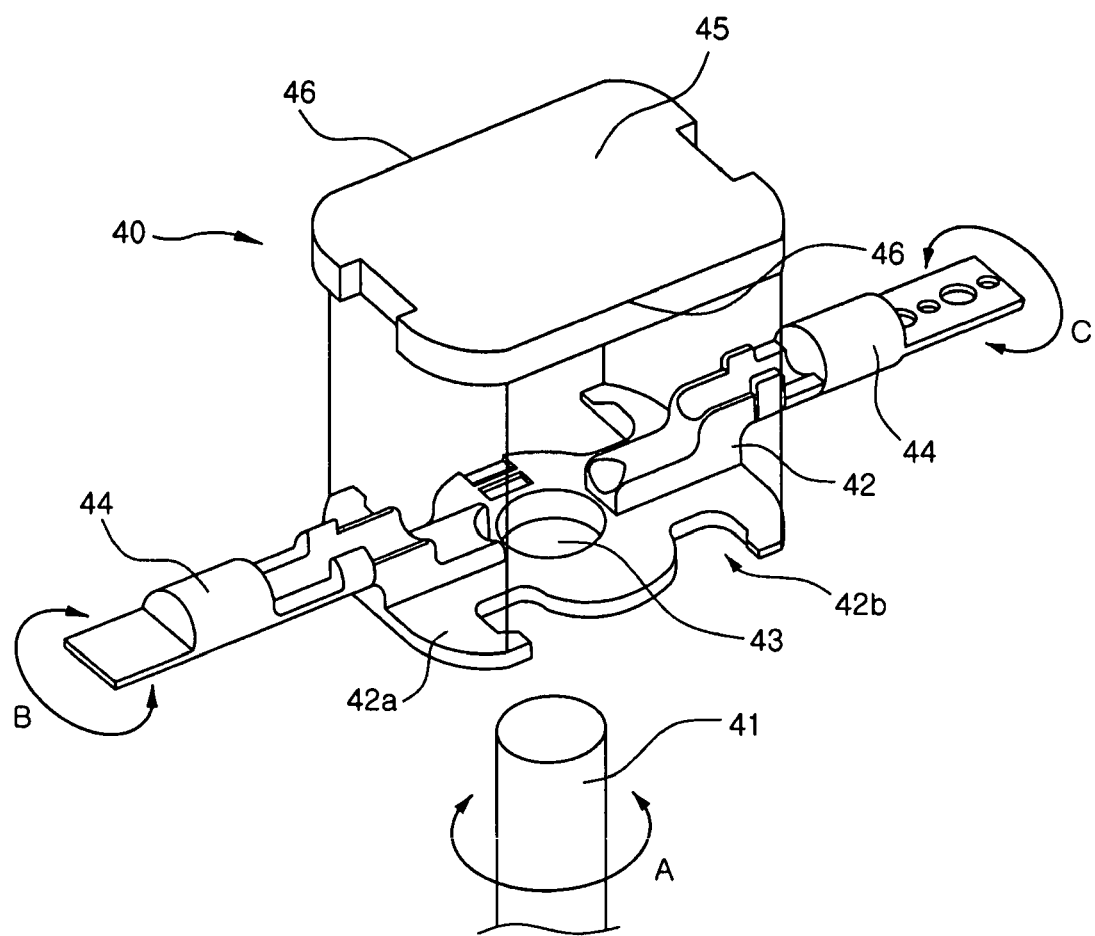
FIG. 4 is a schematic exploded perspective view of a swivel hinge assembly according to an embodiment of the invention.

FIG. 4 is a schematic perspective view of a swivel hinge assembly according to an embodiment of the invention.

Referring to FIG. 4, the swivel hinge assembly 40 comprises a first rotary shaft 41 that extends substantially vertically, a second rotary shaft 42 that extends substantially horizontally and substantially orthogonal to the first rotary shaft 41, and a base cover 45. The first rotary shaft 41 is used for rotating the display unit 15 in a substantially horizontal plane, and at least a portion of the second rotary shaft 42 is used for vertically rotating the display unit 15 in the fore and aft directions. The two shafts perpendicularly intersect with each other and a hole 43 into which a portion of the first rotary shaft 41 is inserted is formed at a center of a base 42a of the second rotary shaft 42. The second rotary shaft 42 can be rotated in a substantially horizontal plane when it is engaged with the first rotary shaft 41 which is rotated in the direction of arrow A in FIG. 4. Further, end portions, or connection arms 44 of the second rotary shaft 42 can be rotated in the fore and aft directions, as shown by the directional arrows B, C in FIG. 4.

The base 42a may take the shape of a partially cut out disc coupled or integral with the second rotary shaft 42, as shown in FIG. 4, having cutout portions 42b. Further, the base 42a may be covered by a base cover 45, also in the shape of a cut out disc, with cutout portions 46, as shown in FIG. 4. The base 42a and cover base 45 rotate together in a substantially horizontal plane.

The second rotary shaft 42 may be configured to be installed on the base 42a, or the second rotary shaft 42 and the base 42a may be integrally formed. Alternatively, the first rotary shaft 41 and the base 42a may be formed integrally.

The first rotary shaft 41 and the base 42a may be mounted on the main body 10 of the electronic device, and the second rotary shaft 42 may be mounted on the display unit 15 to allow the display unit 15 to be rotated substantially horizontally and vertically with respect to the main body 10 of the electronic device.

Figure 5A:
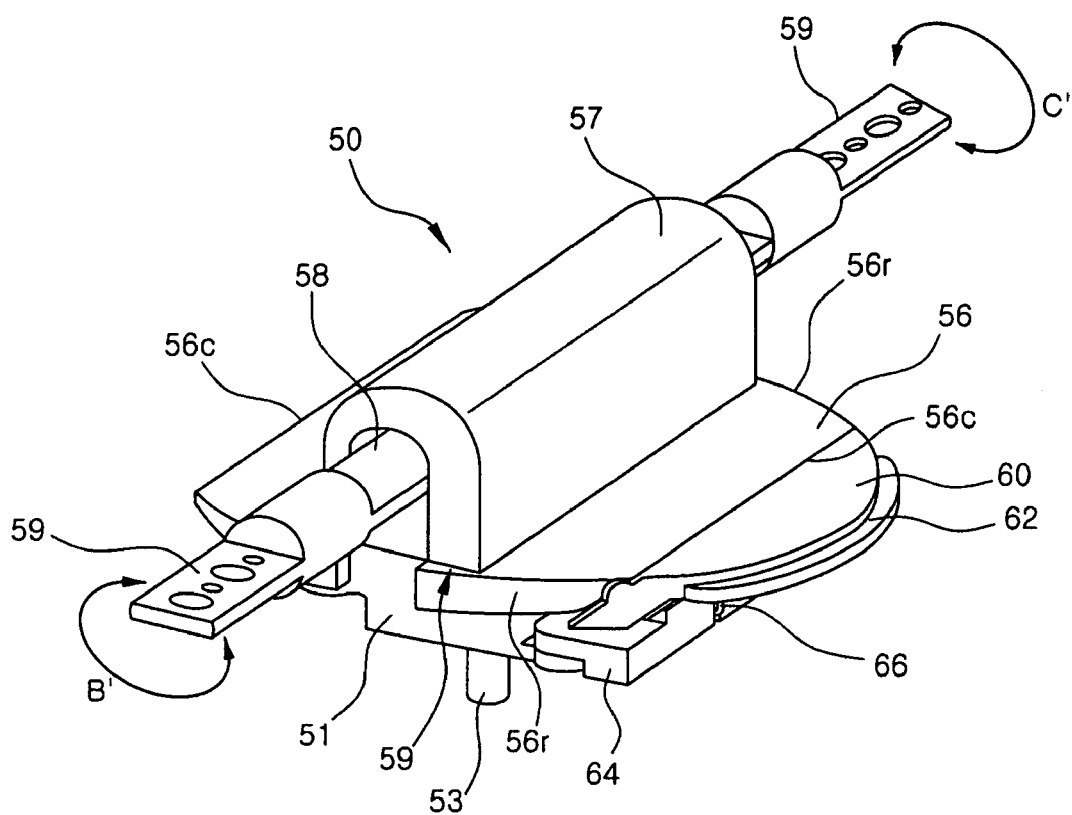
FIG. 5A is a schematic perspective view of a swivel hinge assembly according to another embodiment of the invention.
Figure 5B:
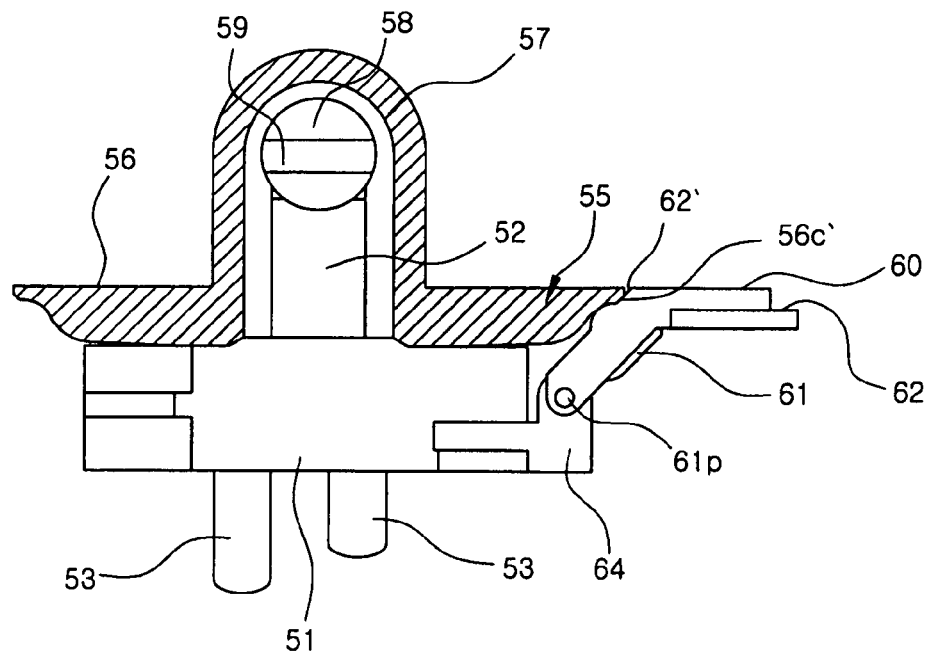
FIG. 5B is a schematic side view of the swivel hinge assembly shown in FIG. 5A.

FIGS. 5A-5B show a swivel hinge assembly according to another embodiment of the invention. The swivel hinge assembly 50 of FIGS. 5A-5B is configured to be connected a main body and a display unit of an electronic device, so as to allow the display unit to be vertically and horizontally rotated with respect to the main body of the electronic device, as viewed from a front of the main body. The swivel hinge assembly 50 shown in FIGS. 5A and 5B may be utilized in an electronic device, for example, a portable electronic device, such as that shown in FIG. 2A-2C, and the following discussion will refer to such a portable electronic device. However, the swivel hinge assembly may also be utilized in other type devices.

The swivel hinge assembly 50 generally comprises a first frame 51, which may be in the form of a mounting base configured to be mounted to a main body of an electronic device, such as main body 10 shown in FIGS. 2A-2C, and a second frame 55 configured to be rotatable relative to the first frame 51 and connected with a display unit, such as display unit 15 shown in FIGS. 2A-2C, so as to move together with the display unit.

The first frame 51 is fixed to the main body 10 and is provided with a horizontal shaft 52, as shown in FIG. 5B, on a top surface thereof A plurality of fixing pins 53 are formed to protrude from a bottom surface of the first frame 51. The fixing pins 53 are fitted into corresponding recesses in the main body 10 so that the swivel hinge assembly 50 can be firmly fixed to the main body 10.

As shown in FIG. 5B, the second frame 55 is configured to be rotatable in a substantially horizontal plane about the rotary shaft 52 and with respect to the first frame 51. The second frame 55 is provided with a housing 57 and a base 56. The base 56 may be formed integral with the housing 57, or the base 56 and housing 57 may be formed as separate pieces.

Figure 7A:
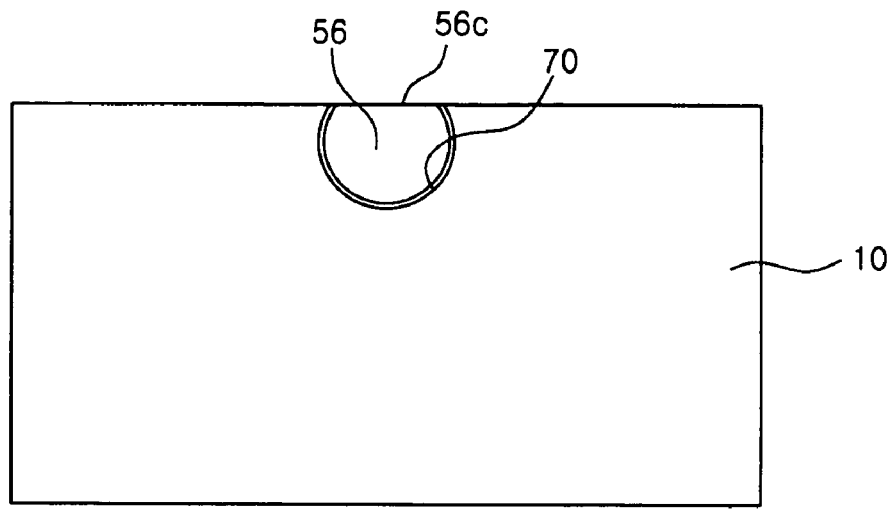
FIG. 7A is a schematic perspective view of a base with a single cutout portion formed therein in accordance with an embodiment of the invention.
Figure 7B:
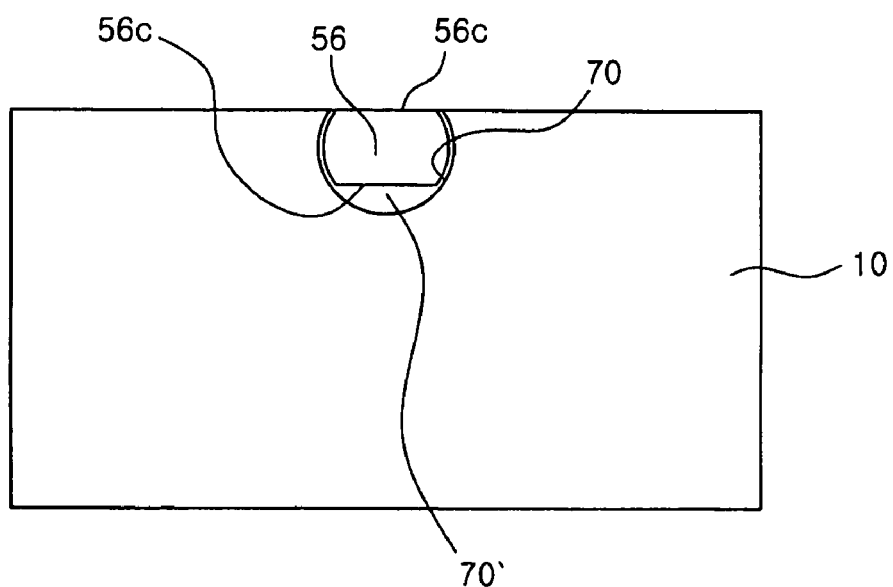
FIG. 7B is a schematic perspective view of a base with cutout portions formed at both ends thereof in accordance with an embodiment of the invention.

In this embodiment, the base 56 is roughly disc-shaped, and includes rounded portions 56r having a predetermined radius of curvature and straightly formed cutout portions 56c. The cutout portions 56c are symmetrically formed on opposite sides of the base 56. In other words, in this embodiment, the base 56 is in the shape of a disc, opposite ends of which are cut out, as viewed from above in a plan view (see, for example, FIG. 7A). Referring, for example, to FIGS. 7A-7B, as viewed from the top of the main body 10, the cutout portions 56c do not protrude from the rear end of main body 10 but define a portion of the rear end of the main body 10 when the display unit 15 is not rotated, or has been rotated 180 degrees in a horizontal direction.

The housing 57 has a rounded external surface, as shown in FIG. 5A. Both ends of the housing 57 are open and the interior of the housing extends along a longitudinal direction. The housing 57 is configured to be placed into a corresponding recess in the display unit 15.

The rotary shaft 52 is placed at a center of the housing 57. Further, a rotary shaft 58 is rotatably installed within the longitudinally extending interior of the housing 57, and with respect to the rotary shaft 52. The rotary shaft 58 functions as a horizontally extending axis of rotation about which the display unit 15 is rotated in fore and aft directions.

Connection arms 59 for connection with the display unit 15 are provided on both ends of the rotary shaft 58. The connection arms 59 are fastened with fastening means, such as screws, to the display unit 15 so that both of the rotary shaft 58 and the display unit 15 can be simultaneously rotated with respect to the second frame 55. In this embodiment, the display unit 15 is preferably rotatable about the rotary shaft 58 only when a predetermined force is applied thereto.

Further, the second frame 55 is configured to be fastened to the display unit 15, while the base 56 is configured to be fastened to the main body 10. To allow the base 56 to be horizontally rotated, a circular opening having a diameter corresponding to that of the base 56 may be formed on the main body 10.

For example, FIGS. 7A and 7B show an opening 70 formed on a top surface of the main body 10. FIG. 7A shows an embodiment for which only one cutout portion 56c is formed on the base 56, while FIG. 7B shows an embodiment for which cutout portions 56c are formed on opposite sides of the base 56.

When the base 56 shown in FIG. 7A has been rotated 180 degrees, a part of the opening 70 is open. Further, in case of the base 56 shown in FIG. 7B, a part of the opening 70 is also open due to the presence of the cutout portions 56c of the base 56.

To cover the opened regions shown in FIGS. 7A and 7B, a cover plate 60 may employed according to embodiments of the invention. Although it is described for this embodiment that the cover plate 60 is connected to the first frame 51, the cover plate may be installed directly onto the main body 10. The cover plate 60 may be semicircular in shape and defined by a rounded curve and a chord corresponding to a length of the cutout portion 56c with an area corresponding to a region removed from the circular base 56.

In this embodiment, the cover plate 60 includes a connection leg 61, which extends downward from the cover plate 60. A tip end of the connection leg 61 is pivotally attached to a supporting portion 64 of the first frame 51 by a hinge pin 61p. The supporting portion 64 may be integrally formed with the first frame 51.

The cover plate 60 is formed with a stepped portion 62 along the rounded periphery thereof. The stepped portion 62 is placed into the main body 10, and thus, a top surface of the cover plate 60 is at the same level as that of the base 56 when the open region is covered with the cover plate 60. However, in the case where the cover plate 60 is installed directly to the main body 10, the stepped portion is not required.

An inclined guide plane 62a is formed on the cover plate 60 at a portion adjacent the cutout portion 56c. The inclined guide plane 62a is formed inclined downward toward the cutout portion 56c. The cutout portion 56c also has a corresponding inclined plane 56d.

An elastic force is exerted on the cover plate 60 by means of an elastic member 66 fixed to the supporting portion 64. The elastic member 66 exerts elastic force on the cover plate 60 in such a direction that the top surface of the cover plate 60 is at the same level as that of the base 56.

The cover plate 60 is received into the main body 10 when the second frame 55 rotates. When the display unit 15 is not rotated or has been rotated 180 degrees, the open region of the opening 70 is covered with the cover plate 60.

Figure 6A:
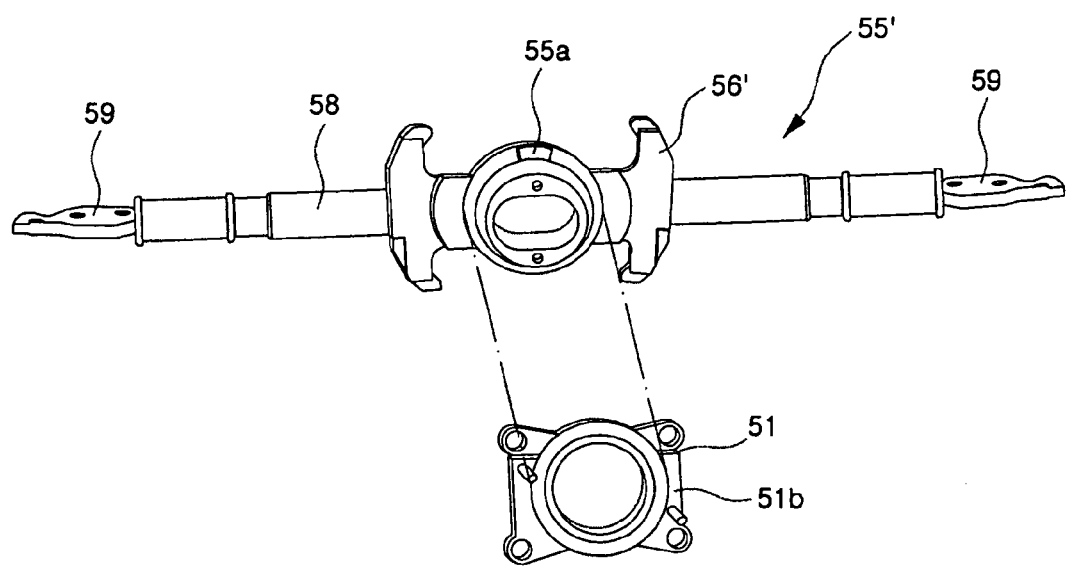
FIG. 6A is a schematic exploded perspective view of a swivel hinge assembly according to another embodiment of the invention.
Figure 6B:
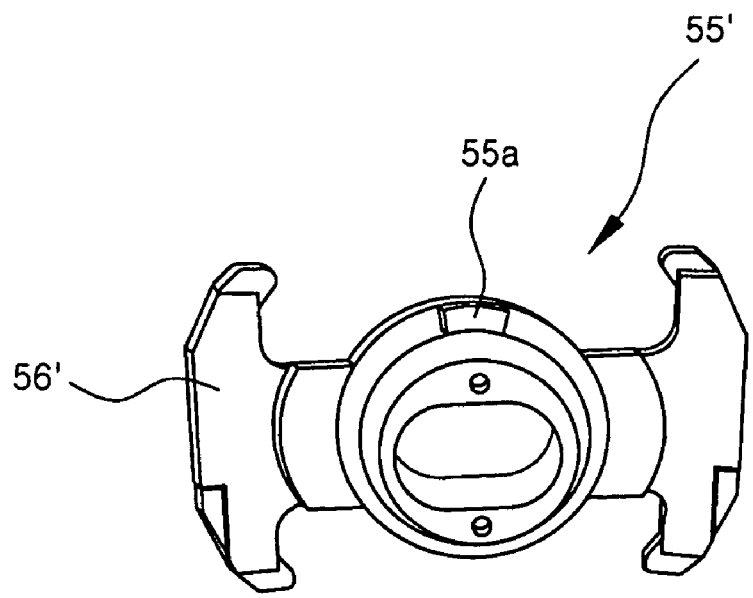
FIG. 6B is a schematic perspective view of a portion of the second frame of the swivel hinge assembly of FIG. 6A.
Figure 6C:
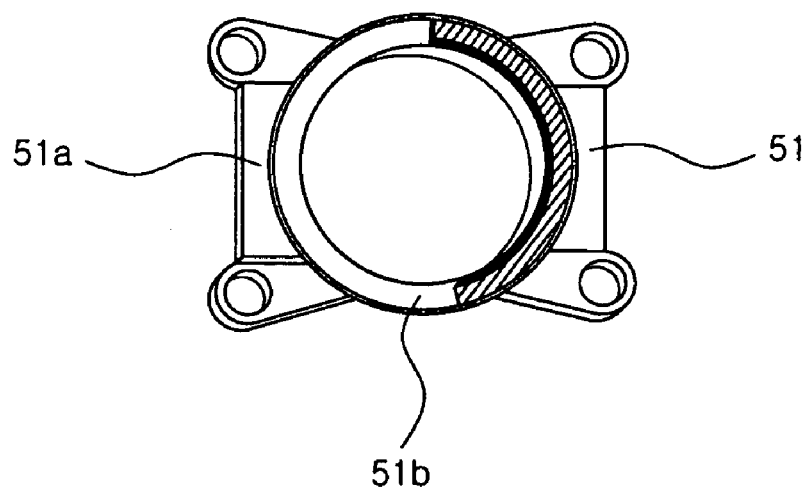
FIG. 6C is a schematic perspective view of the first frame of the swivel hinge assembly of FIG. 6A.

FIGS. 6A-6C show a swivel hinge assembly according to another embodiment of the invention. The swivel hinge assembly 50' is similar to the swivel hinge assembly of FIGS. 4 and 5A-5B.

In this embodiment, the second frame 55' comprises a base 56'. Rotary shaft 58 extends from the base 56' and includes rotatable connection arms 59. In this embodiment, the base 56' is in the form of a cut out disc, as shown in FIG. 6A. Protruding stepped end portions 56a of the base 56' are configured to interact with the cover plate 60 similar to the embodiment of FIGS. 5A-5B.

Further, the second frame 55' includes a shaft 55b configured to mate with a hollow shaft 51b of the first frame 51, and may be in the form of a mounting base configured to be attached to a main body 10 of a portable electronic device, so as to be rotatable with respect thereto. The second frame 55' may include a projection 55a configured to mate with a groove 51a formed in the shaft 51b to limit the rotation of the shaft 55b.

In this embodiment, the base 56' of the second frame 55' may or may not be covered by a housing similar to housing 57, or the combination of housing 57 and base 56, which would cover and protect base 56'.

The operation of the swivel hinge assembly and a portable electronic device having the same constructed according to embodiments of the invention will be described generally below. The following discussion refers to FIGS. 5A-5B. However, it should be understood that the embodiments of FIGS. 4 and 6A-6C operate in a similar fashion and thus extraneous discussion has been omitted.

FIG. 3 shows a portable electronic device in a state in which the main body 10 and the display unit 15 are folded to face each other. This state corresponds to a state in which a user carries the portable electronic device. FIGS. 2A and 2B show a state in which the display unit 15 of the portable electronic device has been rotated in fore and aft directions about the vertical rotary shaft 58. This state corresponds to a case in which a user may perform an input operation through the input unit 12. As previously stated, in some embodiments, the user may perform the input operation by bringing a stylus pen 25 into contact with a top surface of the display unit 15.

Figure 8:
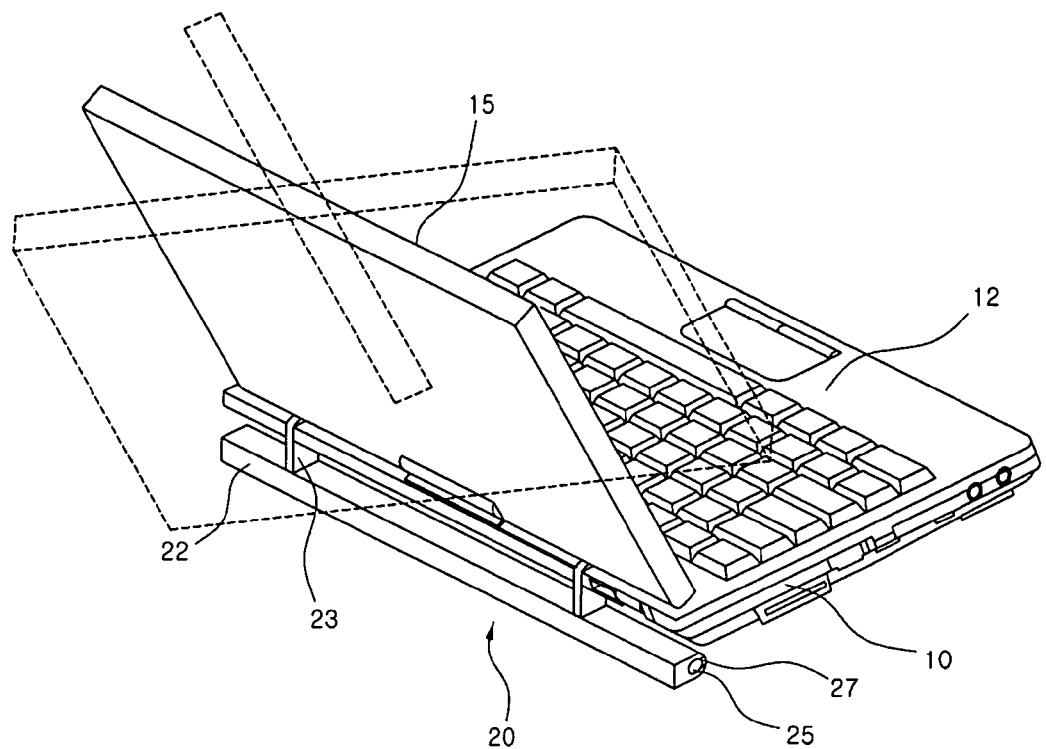
FIG. 8 is a schematic perspective view showing a state in which a display unit is rotated substantially horizontally in a portable electronic device in accordance with an embodiment of the invention.

FIG. 8 shows a state in which the display unit 15 has been rotated about the rotary shaft 52 in a state shown in FIGS. 2A and 2B. That is, the display unit 15 has been vertically rotated about the rotary shaft 58 and then horizontally rotated about the rotary shaft 52. The display unit 15 can be rotated about the rotary shaft 58 up to about 180 degrees, the display unit 15 can be rotated about the rotary shaft 52 up to 360 degrees. In the embodiment of FIG. 4, the display unit 15 is vertically rotated via connection bars 44, and then horizontally rotated about the rotary shaft 41. In the embodiment of FIG. 6A-6C, the display unit 15 is vertically rotated via rotatable connection arms 59 and then horizontally rotated about the mounting base 51.

Referring to FIG. 8, an input operation can easily be made to the input unit 12 by causing the rear end of the main body 10 to be relatively higher than the front end thereof This is accomplished by unfolding the tilting stand 20 from the rear end of the main body 10 and supporting it on a surface, as shown in FIG. 8.

In a state where the tilting stand 20 is securely seated on the rear end of the main body 10, as shown in FIGS. 3 and 8, the tilting stand 20 functions to prevent the display unit 15 from being unnecessarily or inadvertently rotated about the horizontal rotary shaft 52. That is, since the tilting stand 20 is securely seated on the rear end of the main body 10 and holds one end of the display unit 15 in place, the display unit 15 can be prevented from being arbitrarily rotated.

Figure 9:
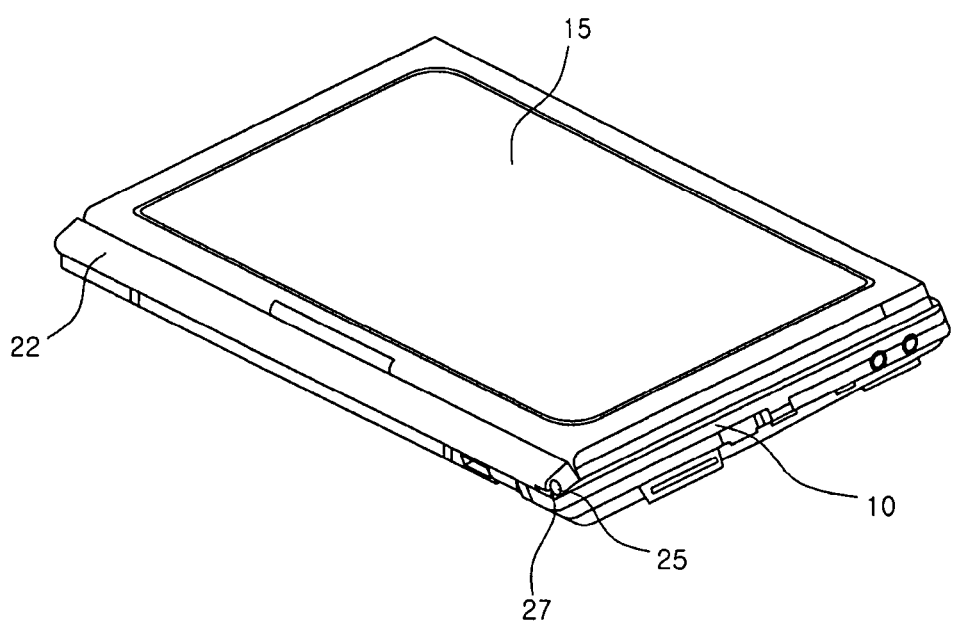
FIG. 9 is a schematic perspective view showing a state in which a rear surface of the display unit is securely seated on a top surface of a main body in a portable electronic device in accordance with an embodiment of the invention.

Further, FIG. 9 shows a state in which a rear surface of the display unit 15 is securely seated on the top surface of the main body 10 so that a front surface of the display unit 15 faces upwards when the portable electronic device is placed on a surface. This state corresponds to a state in which the display unit 15 is configured, for example, in the form of a tablet computer. In such a state, an input operation may be made through the display unit 15 using the stylus pen 25.

Next, in a case in which the display unit 15 is rotated about the rotary shaft 52, the cover plate 60 will be operated. First, when the display unit 15 is not rotated or has been rotated 180 degrees, as shown in FIGS. 2A and 2B, the cover plate 60 will be at the same level as the top surface of the main body 10. This state is also shown in FIGS. 5A and 5B and corresponds to a state in which the opened region (70' in FIG. 7B) of the opening 70 in the main body 10 has been covered with the cover plate 60.

Figure 10A:
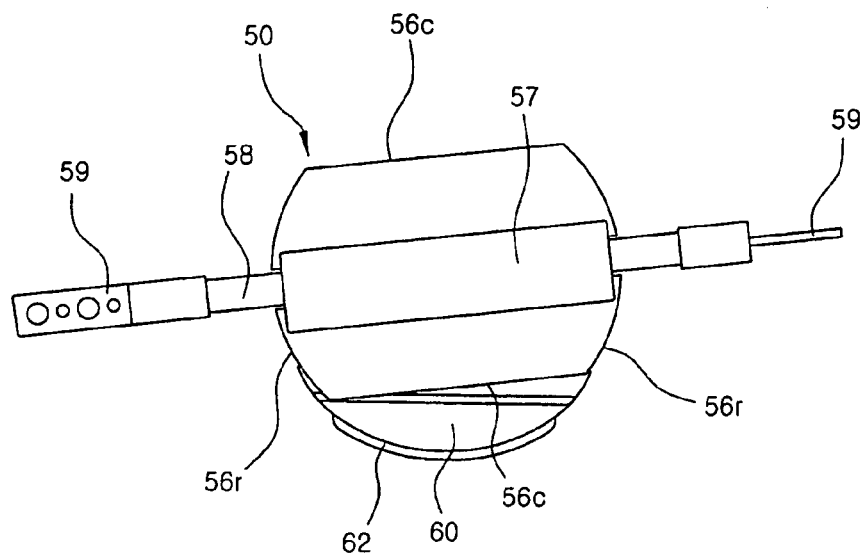
FIGS. 10A to 12B sequentially show motion of a cover plate according to the operation of a swivel hinge assembly in accordance with an embodiment of the invention.
Figure 10B:
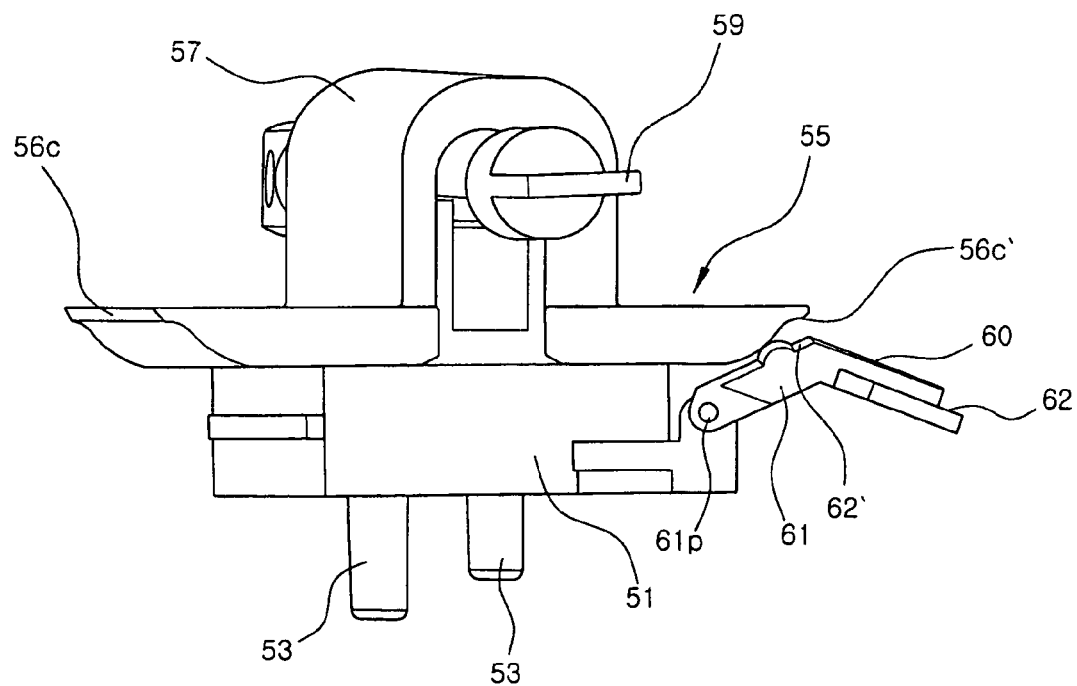
Figure 11A:
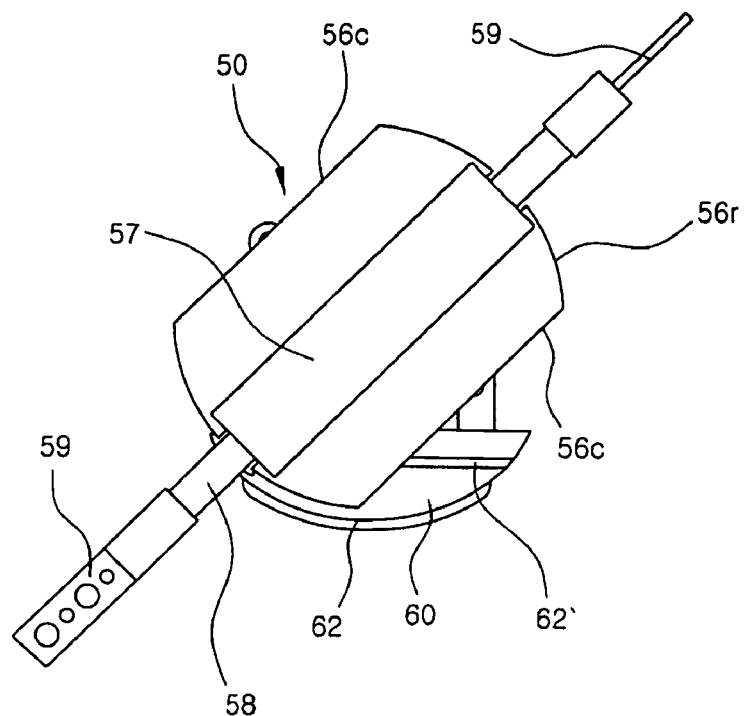
Figure 11B:
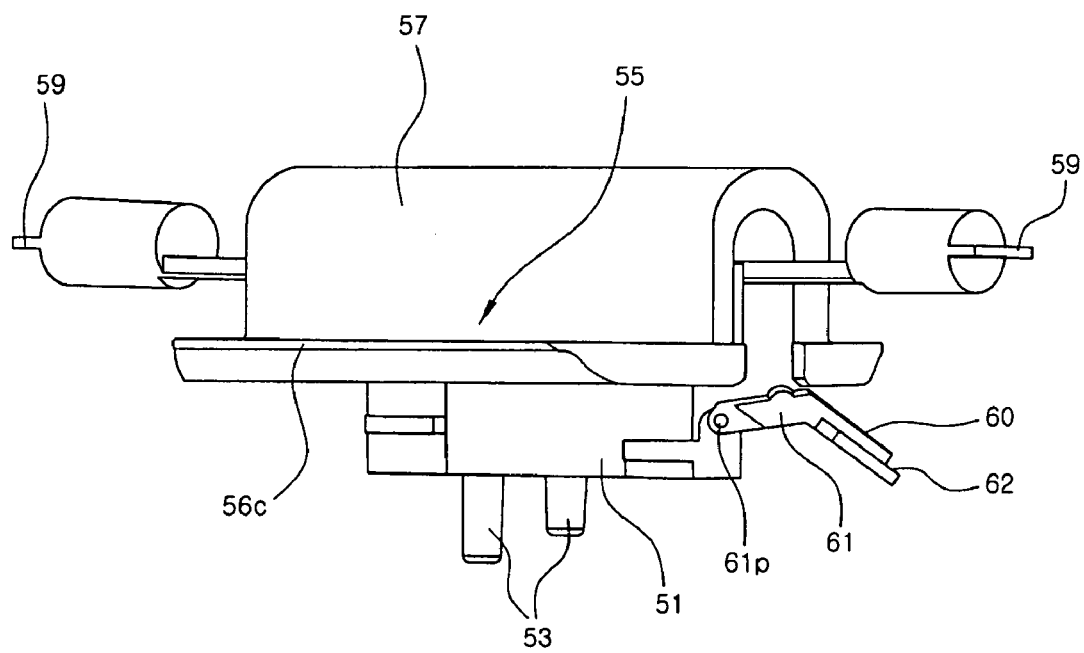

The cover plate 60 is raised and/or lowered by the rotation of the display unit 15, that is, the rotation of the base 56 (base 42a in the embodiment of FIG. 4; base 56' in the embodiment of FIGS. 6A-6C). When the display unit 15 begins to rotate about the rotary shaft 52 from the state shown in FIGS. 2A and 2B, the inclined plane 56d of the cutout portion 56c that was in contact with the inclined guide plane 62a of the cover plate 60 begins to push the inclined guide plane 62a of the cover plate 60. Thus, the cover plate 60 begins to pivot on the hinge pin 61p and to descend while overcoming the elastic force from the elastic member 66. This state is illustrated in FIGS. 10A and 10B. When the display unit 15 is further rotated, the cover plate 60 is pressed down by a bottom surface of the base 56, as shown in FIGS. 11A and 11B.

Figure 12A:
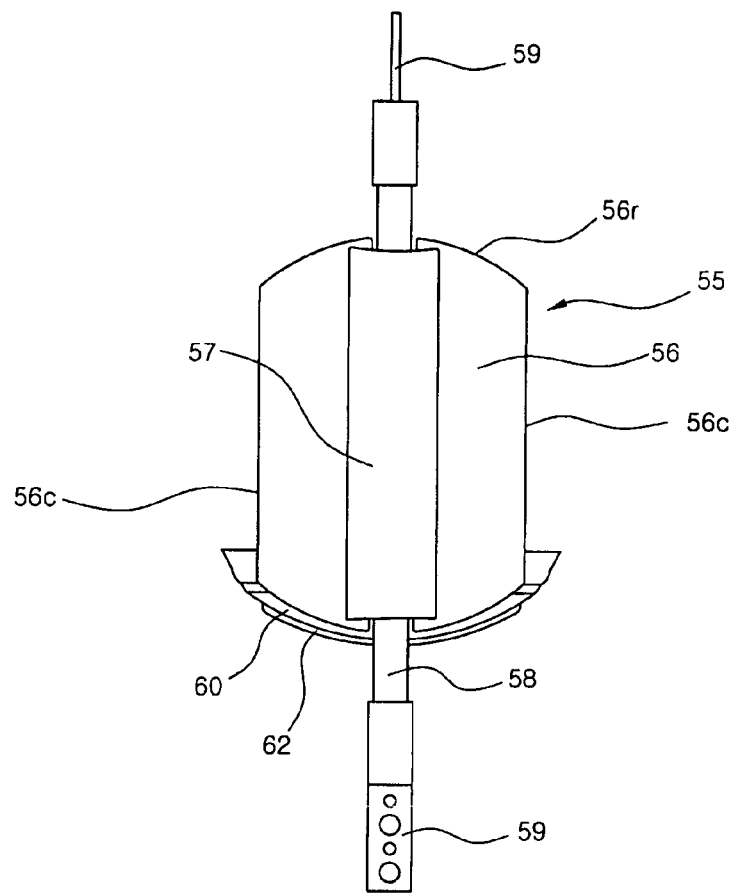
Figure 12B:
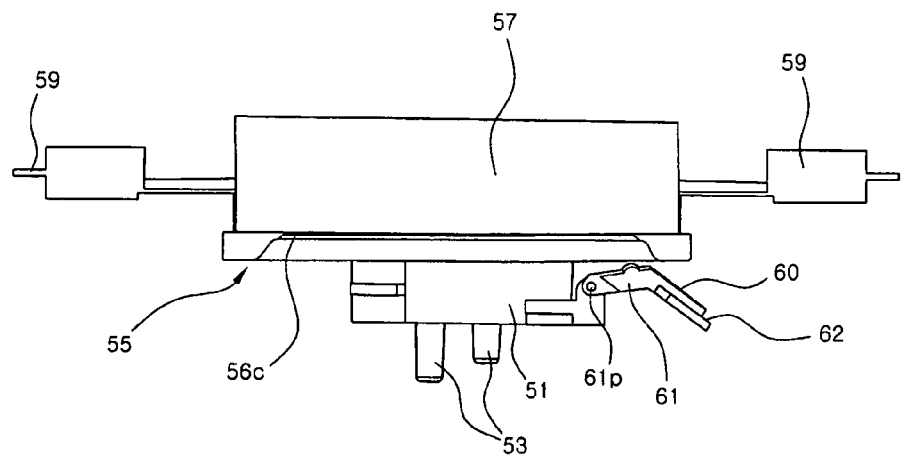

FIGS. 12A and 12B show a state in which the display unit 15 has been rotated 90 degrees. In such a state, the cover plate 60 is kept pressed down by the bottom surface of the base 56.

Further, when the display unit 15 is further rotated 90 degrees from the state shown in FIGS. 12A and 12B, the cover plate 60 is no longer pressed down by the base 56. Thus, the cover plate 60, which functions as a spring-loaded step, is restored to its original state by the restoring force and again covers the opening of the main body 10, thereby releasably locking the base 56 in it original predetermined position.

The cover plate may be installed on the main body and resiliently supported by the elastic member, instead of being installed on the first frame of the swivel hinge assembly. In this way, the cover plate can come into and out of the opening and covers the opening according to the rotation of the base.

Figure 13A:
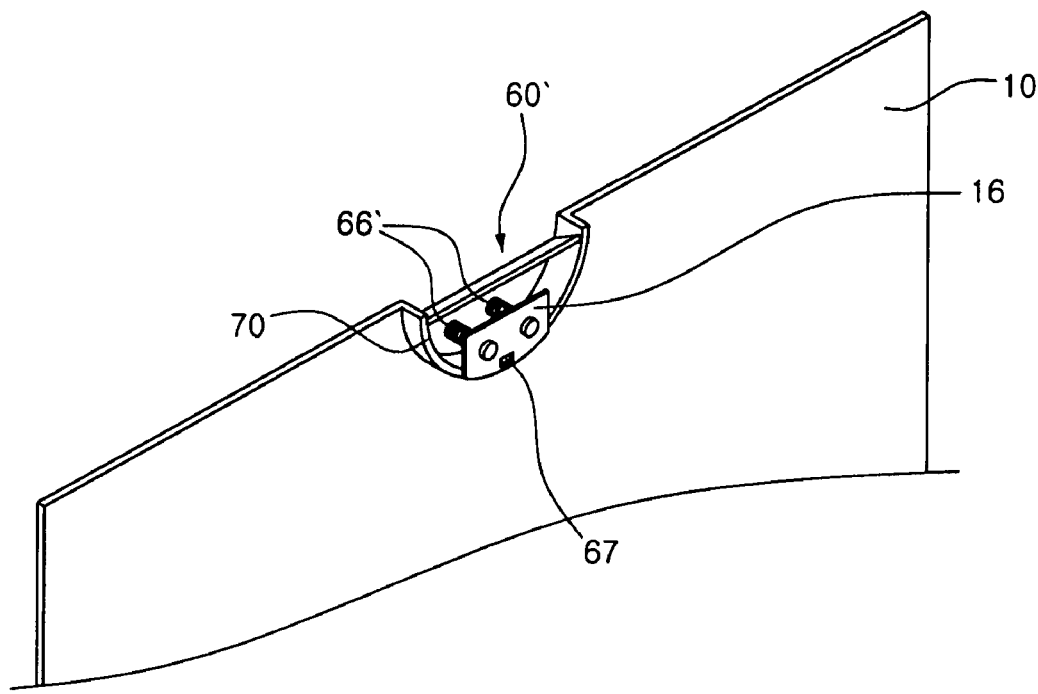
FIG. 13A is a schematic perspective view showing an example in which a cover plate is installed on the main body of a portable electronic device in accordance with an embodiment of the invention.
Figure 13B:
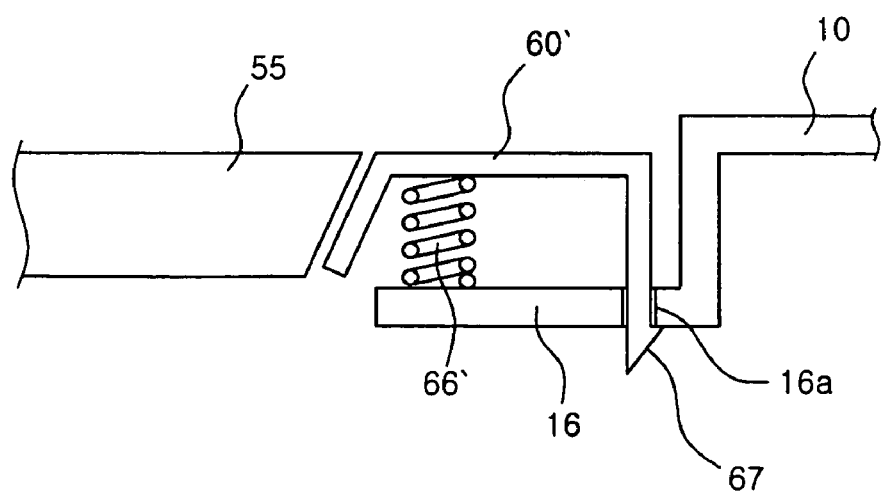
FIG. 13B is a side sectional view of the installed cover plate of FIG. 13A.

FIGS. 13A and 13B show another embodiment in which a cover plate is installed on the main body. FIG. 13A is a perspective view of an upper portion of the main body as viewed from below, and FIG. 13B is a side sectional view of the main body with the cover plate installed therein.

Referring to FIGS. 13A and 13B, cover plate 60', roughly semicircular in this embodiment, is installed within opening 70 formed in the top surface of the main body 10 level with the top surface of the main body. One side of the cover plate 60' is fixed to an extension plate 16 positioned below the opening 70 by a downwardly extending hook 67 of the cover plate 60' fitted into a slot 16a formed in the extension plate. Further, the other side of the cover plate 60' is supported on the extension plate 16 by an elastic member 66', and thus, the cover plate can move up and down in an elastic manner. This up and down motion can be selectively performed according to the horizontal rotation of the base, as described in the foregoing embodiment of the invention.

Figure 14A:
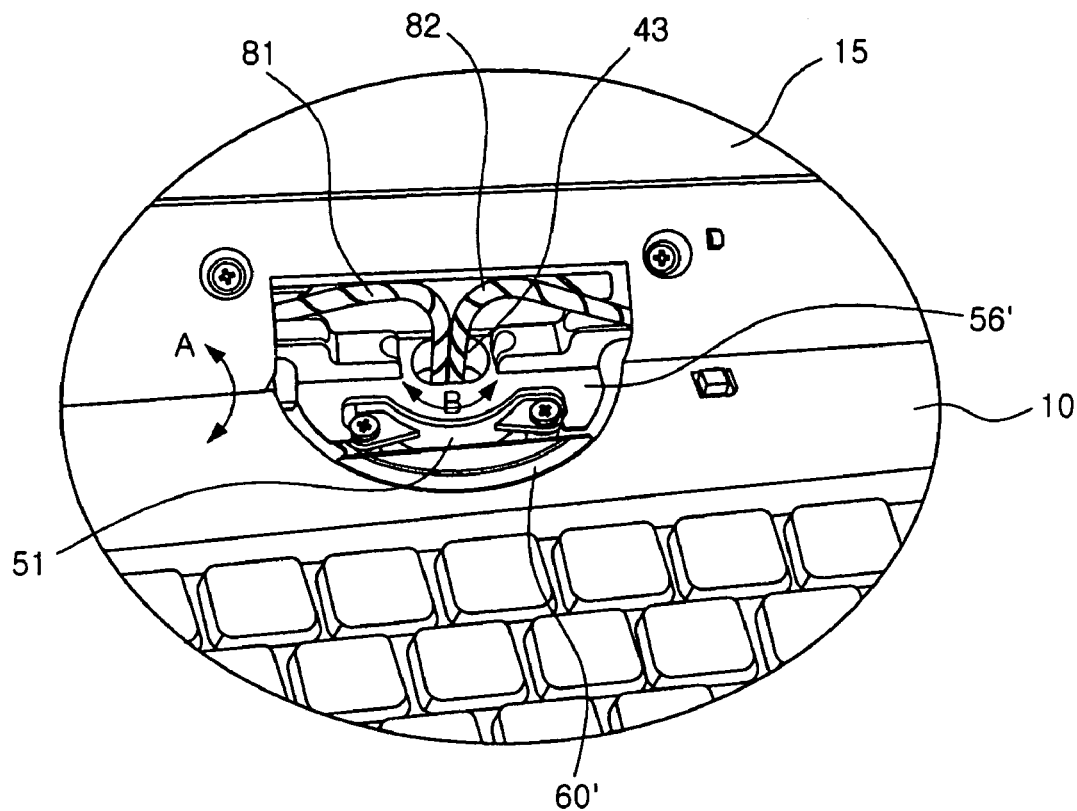
FIG. 14A is a perspective view of a portable electronic device in accordance with an embodiment of the invention.
Figure 14B:
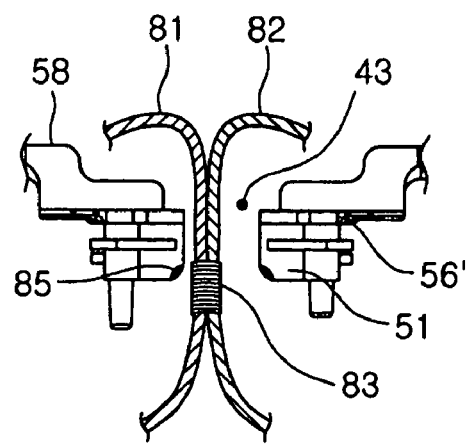
FIG. 14B is a sectional view of the device of FIG. 14A.

FIGS. 14A and 14B show another embodiment in which cables 81, 82 pass through a hole 43 in a base 56' and a hollow shaft 51. The cables connect electronically between a display unit 15 and a main body 10. A first cable 81 may be, for example, an antenna cable configured to communi-cate an antenna (not shown) in a display unit 15. Such an antenna may be indispensable for wireless communication, e.g. wireless Internet or wireless LAN. A second cable 82 may be, for example, a cable configured to exchange display signals and/or communicate supply electric power between the display unit 15 and the main body 10.

While the first cable 81 and second cable 82 may connect, respectively, different parts in a portable electronic device, both the first cable 81 and second cable 82 preferably pass through the same region, as shown in FIG. 14A, for example, hole 43, simplifying a connecting structure between the display unit 15 and the main body 10.

However, because the first cable 81 and second cable 82 pass through hole 43 in the base 56' and the hollow shaft 51, they are liable to be twisted during repeated rotation of the display unit 15 and be worn due to friction against each other and/or the hollow shaft 51. To avoid such twist, the first cable 81 and second cable 82 are bound to each other by a binding member 83, as shown in FIG. 14B. In addition, a corner of an inner surface of the hollow shaft 51 may be rounded to relieve any friction between the cables 81, 82 and the hollow shaft 51. Optionally, a shock-absorbing member 85, such as a silicon rubber, polyurethane foam and so on, may be attached to a corner of an inner surface of the hollow shaft 51.

Figure 15A:
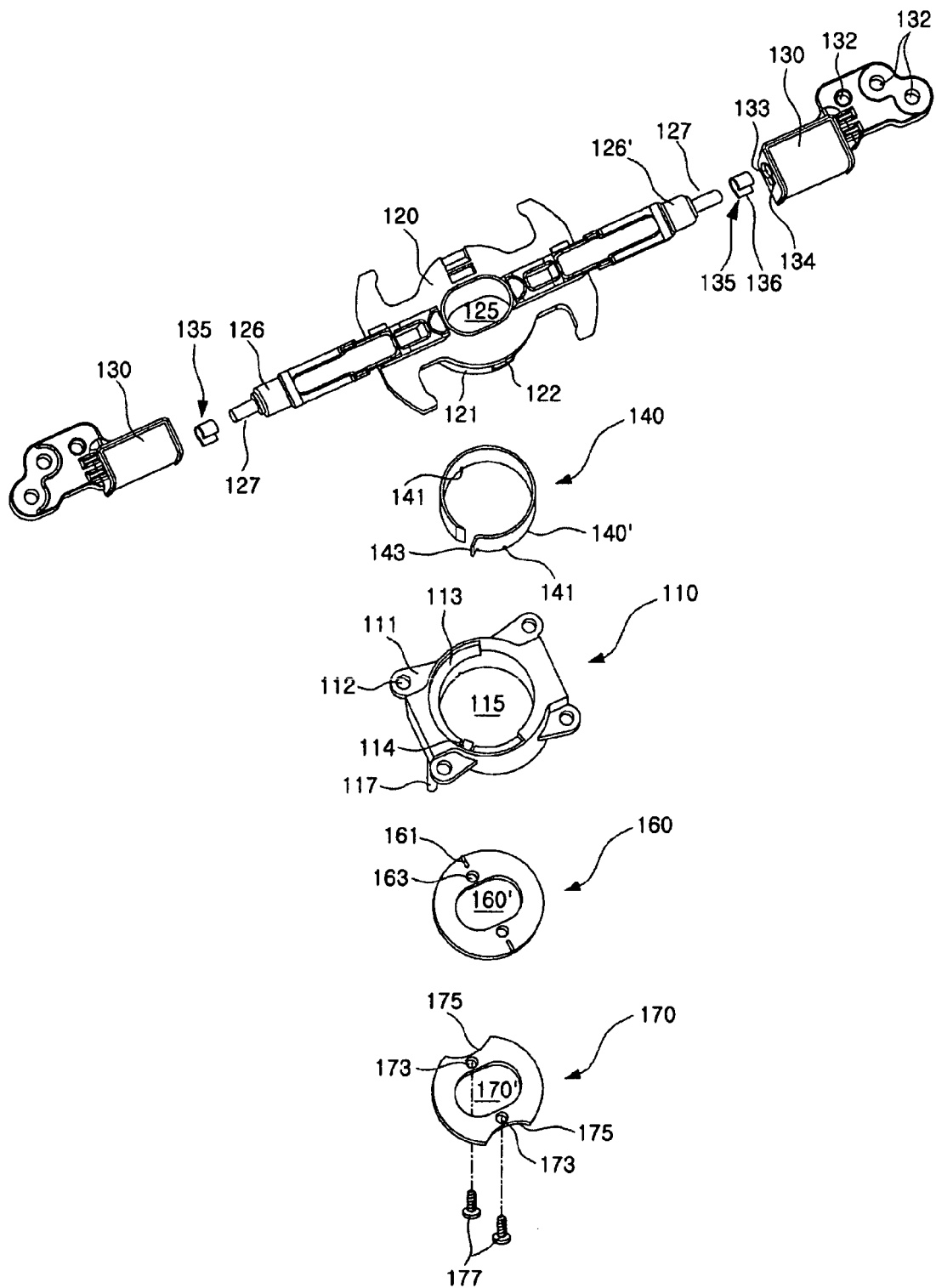
FIG. 15A is an exploded perspective view of a swivel hinge assembly according to another embodiment of the invention.
Figure 15B:
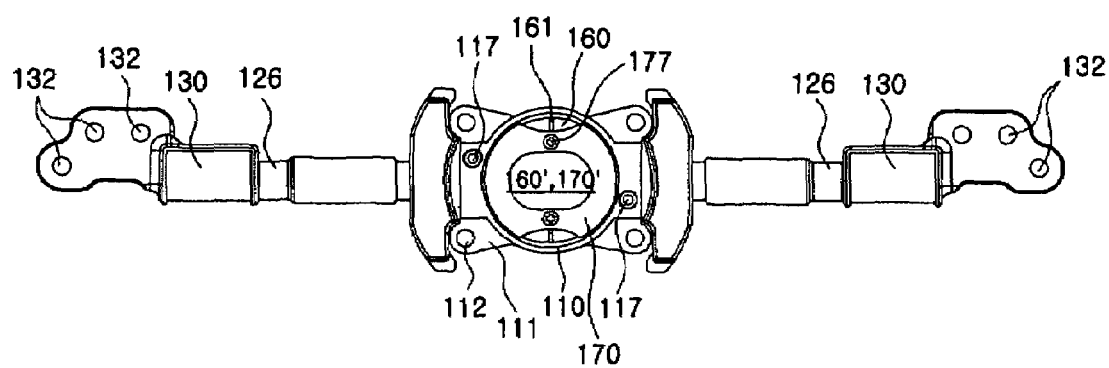
FIG. 15B is a planar view of the assembly of FIG. 15A

FIGS. 15A and 15B show a swivel hinge assembly according to another embodiment of the invention. The swivel hinge assembly comprises a base 110, swivel body 120 and a rotary body 130.

A base 110 is fixed, for example, to a main body of an electronic device. For example, the base 110 may be fixed to a main body of an electronic device by at least one combining unit 111 with a hole 112 formed on the base 110 so as to fix the base 110 to the main body. The base 110 may be provided with a stopper-moving track 113 on its surface. The stopper-moving track 113 guides a stopper 122 provided on the swivel body 120 so that movement of the swivel body 120 is limited to, for example, a semicircular rotation. A slot 114 is formed at a part of the stopper-moving track 113 so that a first pipe-spring 140, as will be described below, can be fixed thereto. The base 110 has a through hole 115 in a center thereof for passing an electric cable therethrough. At least one boss 117 may be formed on an under surface of the base 110.

The swivel body 120 is rotatably connected to the through hole 115 at a center of the base 110 in such a way that a rotary shaft 121 of the swivel body 120 is fitted into the through hole 115. The rotary shaft 121 is preferably circular shaped and with a little small outer diameter compared to an inner diameter of the through hole 115. Such a rotatable structure of the swivel body 120 and the base 110 enables rotation of a display unit relative to a main body in an electronic apparatus. The swivel body 120 also has a through hole 125 in the center of the rotary shaft 121 in order to pass an electric cable therethrough.

Extended bars 126, 126' are formed on both sides of the swivel body 120 and may be provided integrally or separately with a shaft 127. A rotary body 130 with at least one combining hole 132 is configured to be rotatably fitted into the ends of the extended bars 126, 126'. The rotary body 130 may be with an inner hole 133 for insertion of the shaft 127. A slot 134 is formed at a portion of the inner hole 133 so that a second pipe-spring 135 can be fixed thereto. The second pipe-spring 135 functions to limit elastically the rotation of the rotary body 130 with respect to the shaft 127 so that the rotary body 130 can be rotated only when a certain force is applied thereto. The second pipe-spring 135 may be ring-shaped and have a portion which is opened. A lengthened portion 136 may be formed in the exterior on the open portion of the second pipe-spring 135. The lengthened portion 136 is fitted into the slot 134 so as to fix the second pipe-spring 135 to the inner hole 133.

The first pipe-spring 140 may be configured to be installed in the gap between the through-hole 115 of the base 110 and the rotary shaft 121 of the swivel body 120. The first pipe-spring 140 may be ring-shaped and have a portion which is opened. A lengthened portion 143 may be formed in the exterior on the open portion of the first pipe-spring 140. The lengthened portion 143 is fitted into the slot 114 of the stopper-moving track 113 so as to fix the first pipe-spring 140 to the inner through hole 115. The first pipe-spring 140 functions to limit elastically the rotation of the rotary shaft 121 with respect to the base 110 so that the swivel body 120 may not be rotated arbitrarily. The lower edge 140' of the first pipe-spring 140 also functions to limit the rotation of the rotary shaft 121 by friction with a first cover 160, as will be described below. At least one groove 141 may be formed on the lower edge 140'.

A first cover 160 with a through-hole 160' at the center thereof may be fitted into the lower surface of the base 110. The first cover 160 has on its surface at least a protrusion 161, which associates with the groove 141 of the first pipe-spring 140. When the protrusion 161 is fitted into the groove 141 during the rotation of the swivel body 120, it gives a click-feeling so that a certain position on the rotation can be sensed. The first cover 160 also has on surface thereof at least one combining hole 163.

A second cover 170 may be configured to be installed on the lower surface of the first cover 160. The second cover 170 may be approximately circular shaped and have a through-hole 170' at the center thereof At least one side 175 of the second cover 170 is partially cut-off, as shown in FIG. 15A, to accommodate the protrusion 161 of the first cover 160. The second cover 170 is also provided with at least one combining hole 173 corresponding to the hole 163 which allow the covers 160, 170 to be fixed to the swivel body 120 by, for example, at least one screw 177.

The invention provides at least the following advantages.

The invention provides a miniaturized swivel hinge assembly. For example, since the cutout portions are formed at both ends of the base of the swivel hinge assembly according to embodiments of the invention, the size of the swivel hinge assembly can be made relatively small.

Further, the invention improves the degree of freedom of design for a main body in an electronic device employing a swivel hinge assembly, in particular for the top surface of the main body. Furthermore, the invention makes efficient use of a main body in an electronic device employing a swivel hinge assembly. Also, the invention provides an external design of an electronic device employing a swivel hinge assembly which is simpler and more beautiful than prior art devices.

Further, since the vertical and horizontal axes of rotation for the swivel hinge assembly according to embodiments of the invention are not offset from each other, the display unit can be rotated such that the position of the display unit relative to the main body is not changed.

In addition, since the area that the swivel hinge assembly occupies on the main body is further reduced, the keyboard can be shifted as rearward as possible on the top surface of the main board. Therefore, the keying operation can be more conveniently performed.

Further, the opening which allows the base of the swivel hinge assembly to be rotated smoothly can be covered with the cover plate and the swivel hinge assembly does not protrude toward the rear of the main body according to embodiments of the invention. Therefore, the external design meets aesthetic requirements and is preferably to prior art designs.

The foregoing embodiments and advantages are merely exemplary and are not to be construed as limiting the invention. The present teaching can be readily applied to other types of apparatuses. The description of the invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A swivel hinge assembly, comprising:
    a first rotary shaft configured to be rotatable about a substantially vertically extending axis;
    a base in the shape of a planar disc having a pair of oppositely disposed symmetrical cut out portions, each of the cut out portions comprising a plurality of cut outs extending inward toward the first rotary shaft, and configured to be rotatable in a substantially horizontal plane by the first rotary shaft;
    a second rotary shaft, portions of which extend outward from the planar disc between the plurality of cut out portions, and which is configured to be rotatable about a substantially horizontally extending axis, which intersects with the first rotary shaft; and
    a spring-loaded step configured to releasably lock the base in a predetermined position.

2. The swivel hinge assembly as claimed in claim 1, wherein the step is formed with an inclined guide plane at a portion corresponding to the cut out portion of the base.

3. The swivel hinge assembly as claimed in claim 1, wherein the first rotary shaft and the base are integrally formed.

4. The swivel hinge assembly as claimed in claim 1, wherein the base is formed with a hole at a center thereof and the first rotary shaft is inserted into the hole for engagement with the base.

5. The swivel hinge assembly as claimed in claim 1, wherein the second rotary shaft and the base are integrally formed.

6. The swivel hinge assembly as claimed in claim 1, wherein the first rotary shaft and the base are configured to be mounted on an electronic device including a main body and a display unit, and the second rotary shaft is configured to be connected to the display unit of the electronic device, thereby allowing the display unit to be vertically and horizontally rotated with respect to the main body.

7. The swivel hinge assembly as claimed in claim 1, further comprising a mounting base configured to be secured to a main body of an electronic device and to rotatably support the first rotary shaft.

8. The swivel hinge assembly as claimed in claim 7, wherein the mounting base comprises a cylinder configured to receive the first rotary shaft within an inner circumference thereof.

9. The swivel hinge assembly as claimed in claim 8, wherein the first rotary shaft includes a projection configured to mate with a groove provided on the cylinder which limits rotation of the first rotary shaft.

10. The swivel hinge assembly as claimed in claim 8, wherein the mounting base includes one or more fixing pins configured to secure the mounting base to a main body of an electronic device.

11. The swivel hinge assembly as claimed in claim 1, further comprising a cover plate configured to cover the base.

12. The swivel hinge assembly as claimed in claim 11, wherein the cover plate further comprises a housing configured to cover wirings of an electronic device in which the swivel hinge assembly is employed.

13. A portable electronic device comprising the swivel hinge assembly of claim 1.

14. A swivel hinge assembly, comprising:
   a first rotary shaft configured to be rotatable about a substantially vertically extending axis;
   a base in the shape of a planar disc having a pair of oppositely disposed symmetrical cut out portions, each of the cut out portions comprising a plurality of cut outs extending inward toward the first rotary shaft, and configured to be rotatable in a substantially horizontal plane by the first rotary shaft; and
   a second rotary shaft, portions of which extend outward from the planar disc between the plurality of cut out portions, and which is configured to be rotatable about a substantially horizontally extending axis, which intersects with the first rotary shaft, wherein the second rotatable shaft includes grooves semicircular in cross-section configured to receive therein wirings of an electronic device in which the swivel hinge assembly is employed.

15. A swivel hinge assembly for use in an electronic device including a main body and a display unit, the swivel hinge assembly comprising:
   a first frame;
   a second frame, including a base in the shape of a planar disc having a pair of oppositely disposed symmetrical cut Out portions, each of the cut out portions comprising a plurality of cut outs extending inward toward a substantially vertically extending axis of rotation, which is mounted on the first frame so as to be rotatable in a substantially horizontal plane about the substantially vertically extending axis of rotation with respect to the first frame;
   a rotary shaft, portions of which extend outward from the planar disc between the plurality of cut Out portions, and which is configured to be rotatable about a substantially horizontally extending axis of rotation substantially orthogonal to the first axis of rotation;
   a housing configured to cover a central portion of a top surface of the second frame; and
   a cover plate in the shape of a semicircle having a chord with substantially the same length as the cutout portions of the base, wherein the housing is part of the cover plate.

16. The swivel hinge assembly as claimed in claim 15, wherein the rotary shaft extends through the housing.

17. The swivel hinge assembly as claimed in claim 15, further comprising a spring-loaded step configured to releasably lock the base in a predetermined position with respect to an opening in a main body of an electronic device in which the swivel hinge assembly is employed.

18. The swivel hinge assembly as claimed in claim 17, wherein the step is formed with an inclined guide plane at a portion corresponding to the cutout portion of the base.

19. The swivel hinge assembly as claimed in claim 18, wherein the step further includes a stepped portion formed adjacent an inner circumference of the opening.

20. The swivel hinge assembly as claimed in claim 15, wherein the first frame includes one or more fixing pins configured to secure the first frame to a main body of an electronic device.

21. A portable electronic device comprising the swivel hinge assembly of claim 15.

* * * * *